United States Patent [19]

Weber et al.

[11] Patent Number: 5,487,950
[45] Date of Patent: Jan. 30, 1996

[54] MULTILAYER LACQUERING OF POLAR FILM SUBSTRATES BY A SINGLE APPLICATION OF MATERIAL

[75] Inventors: Gunter Weber, Fallingbostel; Ulrich Reiners, Neuenkirchen; Sebastian Meyer-Stork, Bielefeld, all of Germany

[73] Assignee: Wolff Walsrode Aktiengesellschaft, Walsrode, Germany

[21] Appl. No.: 191,568

[22] Filed: Feb. 3, 1994

[30] Foreign Application Priority Data

Feb. 10, 1993 [DE] Germany ............... 43 03 833.6

[51] Int. Cl.⁶ ............... B32B 9/04
[52] U.S. Cl. ............... 428/484; 428/485; 428/486
[58] Field of Search ............... 428/34.3, 34.8, 428/35.4, 36.6, 485, 486, 484

[56] References Cited

U.S. PATENT DOCUMENTS

| | | | |
|---|---|---|---|
| 3,874,905 | 4/1975 | Knights | 428/486 |
| 3,900,670 | 8/1975 | Ikeda et al. | 428/319.7 |
| 3,985,937 | 10/1976 | Fife | 428/486 |
| 4,097,297 | 6/1978 | Keene | 106/177 |
| 4,267,094 | 5/1981 | Huhn et al. | 260/29.6 RW |
| 4,283,426 | 8/1981 | Schenk et al. | 426/105 |
| 4,321,175 | 3/1982 | Schmidt et al. | 524/555 |
| 4,410,011 | 10/1983 | Andrä et al. | 138/118.1 |
| 5,188,867 | 2/1993 | Chu et al. | 427/173 |

FOREIGN PATENT DOCUMENTS 0381454 8/1990 European Pat. Off. .
WO9404616 3/1994 WIPO .

Primary Examiner—James C. Housel
Assistant Examiner—Long V. Le
Attorney, Agent, or Firm—Sprung Horn Kramer & Woods

[57] ABSTRACT

The invention relates to the lacquering of polar film substrates with a coating system consisting of several components, the single application of material resulting in a multilayer structure of the lacquer coat. The coating system is preferably aqueous and free from organohalogen and results in an improved barrier action of the films against water vapour.

12 Claims, No Drawings

MULTILAYER LACQUERING OF POLAR FILM SUBSTRATES BY A SINGLE APPLICATION OF MATERIAL

The invention relates to the lacquering of polar film substrates with a coating system consisting of one or more components, a single application of material resulting in a multilayer structure of the lacquer coating.

Coating systems for metals whose imcompatible components separate when applied as a single application to result in a multilayer structure are known particulary in the field of automobile lacquering. Suitable systems are described e.g. in GB 1 570 540 and GB 2 046 765A as powder lacquers and in GB 2 192 399A as solvent based systems. The exact positioning of each component in the arrangement of layers depends on the ratio of the specific surface energies. The component having the lowest surface energy forms the uppermost layer while the component having the highest surface energy—assumed to be a polar component—becomes positioned at the base.

The specific surface energy can easily be measured as the surface tension δ (Römpp Chemie Lexicon, vol. 4, G. Thieme Verlag, Stuttgart (1991) p. 3075–3076).

In the case of metal coating, the discovery of combinations of materials having a suitable gradation of surface tensions is facilitated by the fact that these substrates have extremely high surface energies. Thus according to Handbook of Chemistry and Physics, 56. ed. CRC Press, Cleveland (1975), pp. F 23–46, the value for aluminium is 870 and for iron 1700 mN/m.

For non-metallic, polar substrates, in particular plastics, the conditions are much less favourable as the surface tensions are generally lower by a factor of 10–15.

One important field of application of plastics lacquering is the lacquering of films whose properties are modified in a predetermined manner by subsequenting coating. In this connection, an increase in the barrier to water vapour is particularly important both for packaging materials and for technical applications.

The systems hitherto frequently used for such coatings which are impermeable to water vapour contain organochloropolymers or organofluoropolymers such as vinylidene chloride (PVDC) or polyvinylidene fluoride (PVDF) but for ecological reasons it is desirable to use coatings which are free from organohalogen.

It is evident from the literature that the only water vapour-impermeable coating polymers available which are free from halogen are polyolefins, in particular polyethylene and polypropylene waxes (see J. M. Mohr, D. R. Paul J. Appl. Polym. Sci. 42 (1991). 1711–1720). As is well known, in order to form an effective barrier against water vapour, these polyolefins must be crystalline as far as possible, but this is a disadvantage for lacquering flexible substrates because the high crystallinity results in brittle coatings which are liable to crack on flexing.

Apart from the aspect of organohalogens, ecological considerations are directed to the problem that most film lacquers have hitherto been based on organic solvents. The emissions which accompany the processing of these products have meanwhile been the subject of much legislation so that it is increasingly aimed to produce purely water based coating systems (see Ullmann's Encyclopedia of Industrial Chemistry, Vol. A 18, p. 368, Verlag Chemie, Weinheim (1991)).

It is therefore an object of the present invention to provide organohalogen-free, aqueous lacquer systems for polar films giving rise to flexible coatings which are impermeable to water vapour.

The invention solves this problem in particular by using coating systems which are-aqueous solutions, emulsions or dispersions containing a wax component and a copolymeric binder. When the lacquer forms a film, a multilayer structure is produced due to the suitably graded surface tensions, the wax forming the barrier layer against water vapour on the exposed surface while the copolymer is situated underneath, on the polar film support. Excellent impermeability to water vapour is thus achieved with a comparatively thin, firmly anchored wax surface so that a flexible coating is obtained.

The invention thus relates to a coating system for polar film substrates which consists of several components applied by a single application to produce a multilayer structure, characterized in that the differences in surface tension (according to DIN 53 914) between the substrate to be coated, which may have been pretreated, and the coating system in the form in which it is applied is at least 10 mN/m, preferably not less than 20 mN/n.

The solution to the problem provided by the invention is surprising since the ratio of free surface energies in the claimed systems is much less favourable than in the case of the coatings on metals mentioned above. Firstly, the polar films suitable for the application of the invention have surface tensions <70 mN/m, which are much lower than those of metals, and secondly the aqueous coating systems in particular require stabilizers, which have the effect of reducing the surface tensions, thereby counteracting the desired separation of the film-forming components.

According to the invention, films suitable for the application of the coatings are those which optionally pretreated have a surface tension of >45 mN/m, preferably >60 mN/n. The following materials are mentioned as examples without thereby limiting the invention:

Films which can be coated with these systems are inter alia films based on biopolymers/such as cellulose hydrate films (cellophane), cellophane films modified by blending with other components (see e.g. DE-OS 4 009 758) and films produced from denatured starch and blends thereof with other thermoplasts, provided the apolar polymeric component does not unduly lower the surface tension (see e.g. EP 0 409 781, EP 0 409 782, EP 0 409 783, EP 0 409 788).

Also suitable are films based on synthetic polymers such as homopolymeric or copolymeric polypropylenes, polyamides, polyesters, polyurethanes, etc., optionally in a oriented form, whose surface tension can be adjusted, if necessary, to a sufficiently high value by an oxidative pretreatment such as low pressure glow discharge, corona discharge, plasma treatment, flaming or mordanting with chromosulphuric acid (see Ullmanns Encyclopädie der technischen Chemie, vol. 15, p. 343, Verlag Chemie, Weinheim (1978)).

The said films and processes for their production are known and described in detail, for example in Kunststoffhandbuch, 2nd ed., Hanser Verlag, Munich, Vienna (1985).

To improve the adherence of the lacquer to the films, these may be coated with so called primers in known manner as well as receiving the above mentioned pretreatments before they are coated. Suitable systems such as polyalkylene imines, polyaminopolyurethanes and polyaminopolyols, polyester resins, ethylene/acrylic acid copolymers and propylene/maleic acid anhydride copolymers, functionalised silanes, etc. (see R. Gächter, H. Müller, Taschenbuch der Kunststoff-Additive, Hanser Verlag, Munich, Vienna (1989) and suitable methods of application are known.

The aqueous solutions, emulsions or dispersions suitable for the application of the coating according to the invention contain waxes of natural or synthetic origin or mixtures thereof. Examples of natural waxes include candelilla, carnauba, montan and paraffin waxes, and examples of synthetic waxes include paraffin and polyethylene waxes. Such compounds are known and are described e.g. in Ullmanns Encyclopädie der technischen Chemie, vol. 24, pp. 1–49, Verlag Chemie, Weinheim (1983). Carnauba waxes are preferably used.

The choice of waxes to be used according to the invention is limited by their melting range because on the one hand the coating must be sufficiently heat resistant and on the other hand the coating system applied must form a complete film. A melting range of from 50° to 120° C. is therefore preferred, in particular from 60° to 90° C. Mixtures of higher melting and lower melting waxes are also effective for this purpose. As regards the particle size of the dispersed or emulsified waxes, particle diameters below 1.0 μm and in particular below 0.1 μm are to be preferred.

As already mentioned, the coating is applied from aqueous solution, emulsion or dispersion. For this purpose, the emulsifiability or dispersibility of the waxes suitable for the invention may be improved by the incorporation of polar groups in known manner (see e.g.: G. A. Russel, J. Am. Chem. Soc., 79 (1957) 3871; M. Irving et al., Polym. Degrad. Stab., 5 (1983) 467, N. G. Gaylord, J. Polym. Sci. Polym. Lett. Ed., 21 (19831) 23–30; A. Neyishi et al., J. Appl. Polym. Sci., 22 (1978) 2953 and A. Hoff, J. Appl. Polym. Sci., 29 (1984) 465). The processes for carrying this out are also described (e.g. in G. M. Gale, Appl. Organomet. Chem., 2 (1988) 17–31).

The solutions, emulsions or dispersions used for applying the coatings according to the invention also contain polymeric binders composed of at least two of the following monomers: acrylates, methacrylates, vinyl acetate, vinyl alcohol, ethylene, propylene, butadiene, styrene, acrylic acid, methacrylic acid, acrylamide and acrylonitrile. Styrene-butadiene-acrylonitrile or styrene-butadiene-acrylate systems are preferably used.

Solutions, emulsions or dispersions suitable for the invention may also contain mixtures of such copolymers.

The above mentioned copolymers and processes for their preparation are known and have been fully described (see e.g. R. W. Lenz, Organic Chemistry of Synthetic High Polymers, Interscience Publishers, New York (1976) or Encyclopedia of Polymer Science and Engineering, Wiley-Interscience, New York (1985, pp. 221–299).

The molar mass limits of the copolymers suitable for the invention are determined inter alia by the fact that if the molecular weight is too low, the required heat resistance of the coating is not obtained, while if the molecular weight is too high, it is difficult to obtain a complete film when the coating is applied.

The range of variation of the composition of suitable copolymers for the invention is limited inter alia by the fact that on the one hand the coating must not be too soft because the coated film would otherwise stick when stored in a rolled up state ("blocking") while on the other hand it must not be too brittle because the coating might otherwise lose its imperviousness to water vapour when mechanical stresses are applied to the package covered by the film. In the copolymer systems described above as preferred, this gradation is achieved by the ratio of butadiene content (soft component) to styrene content (hard component).

When copolymers based on partially saponified polyvinyl acetate are used, a degree of hydrolysis >90 % and a molecular weight >50,000, and in the case of copolymers containing acrylate a molecular weight >150,000, are preferred.

The copolymers to be used according to the invention may in addition contain polar groups such as carboxyl or hydroxyl groups which improve their emulsifiability or dispersibility in aqueous systems and provide possibilities of cross-linking, The cross-linking agents available are inter alia aziridines, dialdehydes, urea formaldehyde and melamine formaldehyde resins, polyamide-epichlorohydrin, resins akali metal hydroxides, zinc salts and zirconium salts and polycarboxylic acids. Such systems and reactions are known and are described e.g. in P. Moles, Polym. Paint Colour J., 181 (1991) 266–267, 282 and D. Lämmermann, Melliand Textilber., 73 (1992) 274–279.

Self-cross-linking systems obtained, for example, by the known method of incorporating N-hydroxymethyl groups or thermosetting groups are also suitable (see e.g. K. Plesske, Kunststoffe, 59 (1969, 247–251).

The aqueous coating systems according to the invention based on the above described waxes and copolymers may also contain conventional auxiliaries for improving the dispersibility or emulsifiability of the copolymers as well as stabilizers which counteract subsequent coagulation of the polymer particles. The auxiliaries are generally anionic, neutral or cationic, low molecular weight, oligomeric or polymeric emulsifiers, surfactants or protective colloids of known type (see e.g. Ullmans Encyclopädie der Technischen Chemie, vol. 2, pp. 273–281, Verlag Chemie, Weinheim (1972) or same encyclopedia Vol. 10, pp.449–473 (1975). The solutions, emulsions or dispersions according to the invention may also contain known additives such as catalysts, pigments, solvents, levelling agents, fillers, lubricants, spacers, etc. (see inter alia D. R. Karsa, Special Publication No. 76, Royal Society of Chemistry, (1990).

Conversion of the copolymers and waxes or mixtures thereof to be used according to the invention into an aqueous solution, emulsion or dispersion is carried out by known methods of either dissolving them in a water miscible solvent such as acetone or tetrahydrofuran and subsquently adding water and removing the solvent or of employing high shearing forces, e.g. by means of an Ultra-Turrax stirrer, using nozzles or dissolver discs.

The solutions, emulsions or dispersions used for applying the coatings according to the invention contain 10–60%, preferably 20–35% of the copolymeric binder (based on the solids content) and from 3 to 50 %, preferably from 5 to 20% of the wax component (based on the copolymer). The range of concentration is in practice limited mainly by the viscosity, which should be from 50 to 60 mPas.sec to ensure optimum application of the lacquer.

When multilayer lacquering is carried out by a single application of material it is essential, as already described above, that the surface tensions of the individual components of the coating system be suitably .graded to ensure the required build up of lacquer.. For the coating according to the invention, the copolymeric binder and the wax components should differ in their surface tension by at least 5 mN/m, preferably at least 10 mN/m. The difference between the surface tension of the coating dispersion and that of the support should be at least 10 mN/m, preferably at least 20 mN/n. The surface tensions are measured according to DIN 53 914.

The coatings according to the invention may be applied to one or both sides by spraying, roller application, application with coating knife, casting, brush coating, immersion or printing. They are preferably applied by immersion followed by stripping off the excess with dosing rollers.

After the coating has been dried by heat, it has a weight per unit area of from 5 to 50 g/m$^2$, preferably from 7 to 15 g/m$^2$.

The Examples given below show that as regards the barrier properties of the coating according to the invention, there is a synergistic effect between the wax and the copolymeric binder. The combination of the components gives rise to a barrier effect which is substantially superior to that which would have been expected from adding the barrier effects of the individual components.

The wax component not only produces a barrier effect in combination with the binder but also functions as spacer and lubricant. The examples also show that in some films good sealing properties are obtained from 120° C. upwards by using certain paraffin-containing waxes.

The coated substrates according to the invention are suitable for the production of water vapour proof packages (e.g. food packages) or films for hygienic purposes.

The present invention will now be illustrated in more detail with the aid of the following Examples.

EXAMPLES

In the following Examples, the percentage concentrations are given in w/w unless otherwise indicated and the permeation values for water vapour are determined according to DIN 53 122 at 23° C., 85% r.h. The surface tension δ is measured according to DIN 53 914 and the sealing strength is tested according to Brugger at 5 bar and 0.5 sec.

EAXMPLE 1

The film to be coated is cellophane (Transparit® 325 P; Wolff Walsrode AG, D-3030 Walsrode; 22 μm, δ>70mN/m). Lacquering is carried out on one side with a doctor knife after the film has been fixed on a glass plate. The coating system applied is an aqueous dispersion containing 30% of a copolymer of styrene, butadiene and acrylonitrile (Styrofan® LD 600 S; BASF AG, D-6700 Ludwigshafen; δ=47.6 mN/m) and 10% ( based on the copolymer) of a carnauba wax (Ultralube® W 70 90;Surface Chemie, D-5448 Kastellaun; m.p.: 84° C.; δ=34.3mN/m). Drying takes place in a circulating air drying cabinet at 130° C. up to a surface temperature of 110° C.

A flexible, non-sticky, firmly adhering coating having a weight per unit area of 3.6 g/m², and a permeability to water vapour (WDDU) of 26 g/m². 24 h is obtained.

When the carnauba wax is replaced by a paraffin wax (Mobil EXD 80/338 M; Mobil Oil Ag, D-2000 Wedel; m.p.: 75° C.; δ=35.6 mN/m), the coating has a sealing strength of 4.6 N/15 mm at 120° C. (lacquer/lacquer).

The uncoated material has a WDDU value of 1230 g/m². 24 h and cannot be sealed.

EXAMPLE 2

The film to be coated is a starch blend film (Mater-Bi® A/F 05 h; Novamont-Montedison, D-6236 Eschborn; 33 μm, δ=60 mN/m). The coating is applied as in Example 1 and is dried at 90° C. (circulating air) to a surface temperature of 80° C.

A flexible, non-sticky, firmly adhering coating having a weight per unit area of 4.7 g/m² is obtained. The coating has a permeability to water vapour (WDDU) of 75 g/m²·24 h.

The uncoated material has a WDDU value of 240 g/m²·24 h.

EXAMPLE 3

The film to be coated is a polysaccharide film (Soafil® PSF 330; Mitsubishi Int., D-4000 Düsseldorf; 26 μm, δ=60 nM/n). The coating is applied as in Example 1 and dried at 130° C. (circulating air) to a surface temperature of 110° C.

A flexible, non-sticky, firmly adhering coating having a weight per unit area of 8.9 g/m² is obtained. It provides a permeability to water vapour (WDDU) of 95 g/m²·24 h.

The uncoated material has a WDDU value of 1370 g/m²·24 h.

EXAMPLE 4

The film to be coated is a corona-pretreated polyurethane film (Walopur® 2101AK; Wolff Walsrode AG, D-3030 Walsrode; 50 μm). The coating is applied as in Example 1 and dried at 150° C. (circulating air) to a surface temperature of 130° C.

A flexible, non-sticky, firmly adhering coating having a weight per unit area of 3.3 g/m² is obtained. The coating provides a permeability to water vapour (WDDU) of 15 g/m²·24 h.

The uncoated material has a WDDU value of 50 g/m²·24 h.

When the carnauba wax is replaced by a paraffin wax (Mobil EXD 80/338 M; Mobil Oil AG, D-2000 Wedel; m.p.: 75° C.; δ=35.6 mN/m), the coating has a sealing strength of 2.8 N/15 mm (lacquer/lacquer) and 2.0 N/15 mm (lacquer/film) at 130° C.

EXAMPLE 5

The film to be coated is a corona-pretreated polyester film (Melinex® 813; Deutsche ICI, D-6000 Frankfurt a.M., 12 μm). The coating is applied as in Example 1 and dried at 150° C. (circulating air) to a surface temperature of 130° C.

A flexible, non-sticky, firmly adhering coating having a weight per unit area of 3.9 g/m² is obtained. The coating provides a permeability to water vapour (WDDU) of 12 g/m²·24 h.

The uncoated material has a WDDU value of 20 g/m²24 . h.

When the carbauba wax is replaced by a paraffin wax (Mobil EXD 80/338 M; Mobil Oil AG, D-2000 Wedel; m.p.: 75° C.; δ=36.5 mN/m), the coating has a sealing strength of 1.9 N/15 mm at 120° C. (lacquer/lacquer).

EXAMPLE 6

The film to be coated is a biaxially stretched polyamide film (Emblem 15; Emblem Europe, 1-75010 Pisticci Scalo; 15 μm; δ=65 mN/m). The coating is applied as in Example 1 and dried at 150° C. (circulating air) to a surface temperature of 130° C.

A flexible, non-sticky, firmly adhering coating having a weight per unit area of 3.3 g/m² is obtained. The coating provides a permeability to water vapour (WDDU) of 11 g/m²·24 h.

The uncoated material has a WDDU value of 50 g/m²·24 h.

We claim:
1. A coating system which upon a :single application to a polar film forms a multilayer structure on said film, comprising an aqueous carrier and
   A) a wax melting between about 50° and 120° C. and present as particles of a diameter below 1 μm,
   B) a copolymeric binder, constituting from about 10 to 60% by weight of the solids in said aqueous carrier and comprising monomeric units of at least two members selected from the group consisting of an acrylate, a methacrylate, vinyl acetate, vinyl alcohol, ethylene, propylene, styrene, acrylic acid, methacrylic acid, acrylamide and acrylonitrile,

C) the wax being present in from about 3 to 50% by weight of the copolymeric binder, there being a difference of at least about 10 mN/m in surface tension between an otherwise identical system containing
    i) said wax but not said copolymeric binder, and
    ii) said copolymeric binder but not said wax,
the film having a difference in surface tension of at least about 10 mN/m relative to said coating system.

2. A system according to claim 1, free of organohalogen.

3. A system according to claim 1, wherein the difference between (i) and (ii) is at least about 10 mN/m.

4. A system according to claim 1, wherein the wax melts at from about 60° to 90 °C.

5. A system according to claim 1, wherein the wax is a paraffin wax.

6. A system according to claim 1, wherein the wax is present in from about 5 to 20% by weight of the copolymeric binder.

7. A film coated with one layer composed of a wax and another layer composed of a copolymeric binder, produced by applying to such a film coating system according to claim 1.

8. A coated film according to claim 7, wherein the film is polar.

9. A coated film according to claim 7, wherein the film is cellulosic.

10. A coated film according to claim 7, wherein the film is denatured starch or blends thereof with thermoplastics.

11. A coated film according to claim 7 enclosing an article, as a wrapping therefor.

12. A coated film according to claim 7 enclosing a foodstuff, as a wrapping therefor.

* * * * *